(12) United States Patent
Mayala et al.

(10) Patent No.: US 10,171,409 B2
(45) Date of Patent: Jan. 1, 2019

(54) SYSTEMS AND METHODS FOR PATH OPTIMIZATION IN A MESSAGE CAMPAIGN

(71) Applicant: SELLIGENT, INC., Redwood City, CA (US)

(72) Inventors: Tulsi Ram Mayala, Newark, CA (US); Shriram Vishwanathan, Pune (IN)

(73) Assignee: Selligent, Inc., Redwood City, CA (US)

( * ) Notice: Subject to any disclaimer, the term of this patent is extended or adjusted under 35 U.S.C. 154(b) by 0 days.

(21) Appl. No.: 14/934,438

(22) Filed: Nov. 6, 2015

(65) Prior Publication Data

US 2016/0294765 A1  Oct. 6, 2016

Related U.S. Application Data

(63) Continuation of application No. 13/705,135, filed on Dec. 4, 2012.

(51) Int. Cl.
*H04L 12/58* (2006.01)
*G06Q 10/00* (2012.01)

(52) U.S. Cl.
CPC ............ *H04L 51/34* (2013.01); *G06Q 10/00* (2013.01)

(58) Field of Classification Search
None
See application file for complete search history.

(56) References Cited

U.S. PATENT DOCUMENTS

| | | |
|---|---|---|
| 7,076,533 B1 | 7/2006 | Knox et al. |
| 7,130,808 B1 | 10/2006 | Ranka et al. |
| 7,219,130 B2 | 5/2007 | Kumar et al. |
| 7,698,369 B2 | 4/2010 | Addante et al. |
| 7,720,911 B2 | 5/2010 | Addante et al. |
| 8,625,753 B1 | 1/2014 | Peden et al. |
| 2001/0032128 A1 | 10/2001 | Kepecs |
| 2002/0169654 A1 | 11/2002 | Santos et al. |
| 2003/0182276 A1* | 9/2003 | Bossman ........... G06F 17/30306 |
| 2003/0197783 A1* | 10/2003 | Woody, Jr. ........ H04N 21/44209 348/192 |
| 2004/0088208 A1* | 5/2004 | H. Runge .......... G06Q 10/0633 705/7.31 |
| 2004/0093296 A1 | 5/2004 | Phelan et al. |
| 2004/0167965 A1 | 8/2004 | Addante et al. |
| 2004/0215500 A1 | 10/2004 | Monahan |

(Continued)

*Primary Examiner* — Younes Naji
(74) *Attorney, Agent, or Firm* — Crowell & Moring LLP

(57) ABSTRACT

A method is provided for path optimization for a message campaign. A graphical user interface representation of the message campaign is displayed. Sets of input instructions are received. Each set of input instructions corresponds to a path in the message campaign. The sets of input instructions are executed, causing different electronic messages to be sent according to corresponding paths to different destination targets. Responses are monitored. A winning path is then determined based on a correlation of a criterion with a goal for the message campaign and also the responses or results of executing the plurality of sets of input instructions. The winning path from among the plurality of paths is then upweighted. The message campaign then uses the upweighted winning path by causing a second plurality of electronic messages to be sent through the winning path to destination targets in the plurality of destination targets.

20 Claims, 10 Drawing Sheets

(56) References Cited

U.S. PATENT DOCUMENTS

| | | |
|---|---|---|
| 2005/0182676 A1 | 8/2005 | Chan |
| 2005/0267941 A1 | 12/2005 | Addante et al. |
| 2006/0047563 A1 | 3/2006 | Wardell |
| 2006/0253537 A1 | 11/2006 | Thomas |
| 2006/0293951 A1 | 12/2006 | Patel et al. |
| 2007/0005428 A1 | 1/2007 | Jacobs et al. |
| 2007/0129995 A1 | 6/2007 | Brandow |
| 2007/0288298 A1 | 12/2007 | Gutierrez et al. |
| 2008/0232276 A1* | 9/2008 | Guntur ............... H04L 12/4625 370/256 |
| 2008/0281627 A1 | 11/2008 | Chang et al. |
| 2009/0006561 A1* | 1/2009 | Burckart ............ G06Q 10/107 709/206 |
| 2009/0086701 A1* | 4/2009 | Lohmar ................ H04L 12/18 370/345 |
| 2010/0250477 A1* | 9/2010 | Yadav ................ G06N 99/005 706/14 |
| 2012/0191546 A1 | 7/2012 | Phelan et al. |

* cited by examiner

```
                        / Email-Yes-Path
Email 1 -- Email 2 -- If
                        \ Email-No-Path
```

FIG. 10

SYSTEMS AND METHODS FOR PATH OPTIMIZATION IN A MESSAGE CAMPAIGN

CROSS-REFERENCE TO RELATED APPLICATIONS

This application is a continuation of U.S. application Ser. No. 13/705,135 filed Dec. 4, 2012 which is hereby incorporated by reference in its entirety for all purposes.

FIELD OF THE DISCLOSURE

Systems and methods for path optimization in a digital message campaign are provided.

BACKGROUND OF THE DISCLOSURE

Digital messaging (e.g., e-mail, text messages, etc.) is an essential network service. Many digital messaging systems that send digital messages over the Internet use protocols such as simple mail transfer protocol (SMTP), in the case of e-mail, and other protocols when the digital message is other than e-mail, to send digital messages from one server to another. The messages can then be retrieved with a client using services such as post office protocol (POP) or Internet message access protocol (IMAP). Other protocols for sending digital messages that are e-mails include, but are not limited to, POP3, X.400 International Telecommunication Union standard (X.400), and the Novell message handling service (MHS), and extended simple mail transfer protocol (ESMTP). Specifically, X.400 defines a transfer protocol for sending electronic mail between mail servers and is used in Europe as an alternative to SMTP. MHS, which was developed by Novell, is used for electronic mail on Netware networks.

SMTP transports digital messages among different hosts within the transmission control protocol/Internet protocol (TCP/IP) suite. Under SMTP, a client SMTP process opens a TCP connection to a server SMTP process on a remote host and attempts to send mail across the connection. The server SMTP listens for a TCP connection on a specific port, usually port 25, and the client SMTP process initiates a connection on that port. When the TCP connection is successful, the two processes execute a simple request-response dialogue, defined by the SMTP protocol (see RFC 821 STD 10, simple mail transfer protocol, August 1982, for details), in which the client process transmits the mail addresses of the originator and the recipient(s) for a message. When the server process accepts these mail addresses, the client process transmits the e-mail instant message. The e-mail message contains a message header and message text ("body") formatted in accordance with RFC 822 (RFC822 STD 11, Standard for the format of ARPA—Internet Text Messages, August 1982). Mail that arrives via SMTP is forwarded to a remote server or it is delivered to mailboxes on the local server. On UNIX-based systems, Sendmail is a widely used SMTP server for e-mail. Sendmail includes a POP3 server and also comes in a version for Windows NT. Microsoft Outlook is the most popular mail-agent program on Window-based systems. Similar protocols are used when the digital message is other than e-mail.

The SMTP model (RFC 821) supports both end-to-end (no intermediate message transfer agents "MTAs") and store-and-forward mail delivery methods. The end-to-end method is used between organizations, and the store-and-forward method is chosen for operating within organizations that have TCP/IP and SMTP-based networks. A SMTP client will contact the destination host's SMTP server directly to deliver the mail. It will keep the mail item from being transmitted until it has been successfully copied to the recipient's SMTP. This is different from the store-and-forward principle that is common in many other electronic mailing systems, where the mail item may pass through a number of intermediate hosts in the same network on its way to the destination and where successful transmission from the sender only indicates that the mail item has reached the first intermediate hop. The RFC 821 standard defines a client-server protocol. The client SMTP is the one which initiates the session (that is, the sending SMTP) and the server is the one that responds (the receiving SMTP) to the session request. Because the client SMTP frequently acts as a server for a user-mailing program, however, it is often simpler to refer to the client as the sender-SMTP and to the server as the receiver-SMTP. A SMTP-based process can transfer electronic mail to another process on the same network or to another network via a relay or gateway process accessible to both networks. An e-mail message may pass through a number of intermediate relay or gateway hosts on its path from a sender to a recipient.

A simple model of the components of the SMTP system is shown in FIG. 1. Systems that send digital messages other than e-mail have similar components. Referring to FIG. 1, users deal with a user agent (UA). Popular user agents for UNIX include Berkeley Mail, Elm, MH, Pine, and Mutt. The user agents for Windows include Microsoft Outlook/Outlook Express and Netscape/Mozilla Communicator. The exchange of e-mail using, for example TCP, is performed by an MTA. One MTA for UNIX systems is Sendmail, and a conventional MTA for Windows is Microsoft Exchange Server 2007. Users normally do not deal with the MTA. It is the responsibility of the system administrator to set up the local MTA. Users often have a choice, however, for their user agent. The local MTA maintains a mail queue so that it can schedule repeat delivery attempts in case a remote server is unable. Also the local MTA delivers mail to mailboxes, and the information can be downloaded by the UA (see FIG. 1). The RFC 821 standard specifies the SMTP protocol, which is a mechanism of communication between two MTAs across a single TCP connection. The RFC 822 standard specifies the format of the electronic mail message that is transmitted using the SMTP protocol (RFC 821) between the two MTAs. As a result of a user mail request, the sender-SMTP establishes a two-way connection with a receiver-SMTP. The receiver-SMTP can be either the ultimate destination or an intermediate one (known as a mail gateway). The sender-SMTP will generate commands, which are replied to by the receiver-SMTP (see FIG. 1).

A typical e-mail delivery process is as follows. Delivery processes for digital messages other than e-mail follow similar scenarios. In the following scenario, Larry at terminal 102 sends e-mail to Martha at her e-mail address: martha@example.org. Martha can review here e-mail at terminal 102. Martha's Internet Service Provider (ISP) uses mail transfer agent MTA 106.

1. Larry composes the message and chooses send using mail user agent (MUA) 108. The e-mail message itself specifies one or more intended recipients (e.g., destination e-mail addresses), a subject heading, and a message body; optionally, the message may specify accompanying attachments.

2. MUA 108 queries a DNS server (not shown) for the IP address of the local mail server running MTA 110. The DNS server translates the domain name into an IP address, e.g., 10.1.1.1, of the local mail server.

3. User agent 108 opens an SMTP connection to the local mail server running MTA 110. The message is transmitted to the local mail server using the SMTP protocol. An MTA (also called a mail server, or a mail exchange server in the context of the Domain Name System) is a computer program or software agent that transfers electronic mail messages from one computer to another. Webster's New World Computer Dictionary, tenth edition, Wiley Publishing Inc., Indianapolis, Ind., defines an MTA as an e-mail program that sends e-mail messages to another message transfer agent. An MTA can handle large amounts of mail, can interact with databases in many formats, and has extensive knowledge of the many SMTP variants in use. Examples of high-throughput MTA systems are disclosed in U.S. patent application Ser. No. 10/857,601, entitled "Email Delivery System Using Metadata," filed May 27, 2004 as well as U.S. patent application Ser. No. 10/777,336, entitled "Email Using Queues in Non-persistent memory," filed Feb. 11, 2004, each of which is hereby incorporated by reference in its entirety. One example of an MTA system is the StrongMail MTA (Redwood Shores, Calif.). Conventional MTA programs include, but are not limited to, Sendmail, qmail, Exim, Postfix, Microsoft Exchange Server, IMail (Ipswitch, Inc.), MDaemon (Alt-N Technologies), MailEnable, Merak Mail Server, and qmail.

4. MTA 110 queries a DNS server (not shown) for the MX record of the destination domain, e.g., example.org. The DNS server returns a hostname, e.g., mail.example.org. MTA 110 queries a DNS server (not shown) for the A record of mail.example.org, e.g., the IP address. The DNS server returns an IP address of, for example, 127.118.10.3.5. MTA 110 opens an SMTP connection to the remote mail server providing e-mail service for example.org which is also running MTA 106. The message is transmitted to MTA 106 from MTA 110 using the SMTP protocol over a TCP connection.

5. MTA 106 delivers Larry's message for Martha to the local delivery agent 112. Local delivery agent 112 appends the message to Martha's mailbox. For example, the message may be stored in (e.g., using a sample file path on a UNIX system): /var/spool/mail/martha.

6. Martha has her user agent 114 connect to her ISP. Martha's user agent 114 opens a POP3 (Post Office Protocol version 3, defined in RFC1725) connection with the POP3 (incoming mail) server 112. User agent 114 downloads Martha's new messages, including the message from Larry.

7. Martha reads Larry's message.

The MTA 110, which is responsible for queuing up messages and arranging for their distribution, is the workhorse component of electronic mail systems. The MTA "listens" for incoming e-mail messages on the SMTP port, which is generally port 25. When an e-mail message is detected, it handles the message according to configuration settings, that is, the settings chosen by the system administrator, in accordance with relevant standards such as Request for Comment documents (RFCs). Typically, the mail server or MTA must temporarily store incoming and outgoing messages in a queue, the "mail queue." Actual queue size is highly dependent on one's system resources and daily volumes.

In some instances, referring to FIG. 2, communication between a sending host (client) and a receiving host (server), could involve relaying. In addition to one MTA at the sender site and one at the receiving site, other MTAs, acting as client or server, can relay the electronic mail across the network. This scenario of communication between the sender and the receiver can be accomplished through the use of a digital message gateway, which is a relay MTA that can receive digital messages prepared by a protocol other than SMTP and transform it to the SMTP format before sending it. The digital message gateway can also receive digital messages in the SMTP format, change it to another format, and then send it to the MTA of the client that does not use the TCP/IP protocol suite. In various implementations, there is the capability to exchange mail between the TCP/IP SMTP mailing system and the locally used mailing systems. These applications are called digital message gateways or mail bridges. Sending digital messages (e.g., e-mail) through a digital message gateway may alter the end-to-end delivery specification, because SMTP will only guarantee delivery to the mail-gateway host, not to the real destination host, which is located beyond the TCP/IP network. When a digital message gateway is used, the SMTP end-to-end transmission is host-to-gateway, gateway-to-host or gateway-to-gateway; the behavior beyond the gateway is not defined by SMTP.

Due to their convenience and popularity, e-mails have become a major channel for communications amongst individuals and businesses. Since e-mails can be used to reach a much wider audience in a short period of time, e-mails have also been utilized regularly as a tool in marketing campaigns. There are a number of e-mail marketing companies which have established a market for tracked e-mail campaigns. These companies provide feedback to the e-mail sender when an e-mail was opened by its intended recipient. In some instances, this is accomplished via the inclusion of a 'web beacon' (or a single-pixel gif) which is uniquely coded and linked to the particular recipient of the e-mail. In some instances, in order to generate and send e-mails for a tracked campaign, an end user goes through a multi-step workflow that typically includes: (1) recipient list creation/selection—loading into a mass-mail tool a list of possible recipients and creating a recipient list containing selected recipients for a particular campaign; (2) template authoring—using the mass-mail tool to author the HTML email according to one or more predefined templates; and (3) mail merge and execution (send)—merging the recipient list into the predefined templates, thereby creating separate e-mails which contain unique tracking codes in the form of references to an image on a remote server. These e-mails are then sent by a mail bursting engine. When the recipient opens the e-mail in an HTML-enabled e-mail client, the e-mail client contacts the remote server to retrieve the desired image. Because each image is uniquely coded, the remote server is able to track when the e-mail intended for a particular recipient was opened.

Methods for optimizing e-mail marketing campaigns are available. For example, United States Patent Publication No. 2006/0253537 A1 to Thomas (hereinafter, "Thomas") discloses a method for sending a marketing message in the form of an e-mail to recipients, electronically tracking at least one selected response event occurring as the e-mail is being sent to targeted recipients, and automatically modifying the e-mail that is subsequently sent to targeted recipients in the campaign by changing elements in the e-mail based upon the tracked selected response event. The drawback with this method is that it does not dynamically determine which variables affect the success of an e-mail campaign. Consider a scenario in which the target is to maximize the percentage of time the sent e-mail is opened by recipients. Does the age of the recipients affect this target? Does what appears on the subject line affect this target? Is there some interdependence between age and what is on the subject line that affects this target? Thomas simply does not address these questions. In fact, Thomas makes no effort whatsoever to dynamically segment the recipient population and optimize what is sent to each portion of the recipient population.

In another example, U.S. Pat. No. 7,130,808 B1 to Ranka et al. (hereinafter Ranka) discloses a method for reading a prior stage message state pertaining to a prior stage in a message campaign, reading message performance results representing message trials and message successes from the prior stage, computing a current message state on the basis of the prior stage message state and the message performance results, and generating a current message allocation based on the current message state. As in the case of Thomas, the drawback with Ranka is that it does not dynamically determine which variables affect the success of an e-mail campaign. As in the case of Thomas, consider a scenario in which the target is to maximize the percentage of time the sent e-mail is opened by recipients. Does the age of the recipients affect this target? Does what appears on the subject line affect this target? Is there some interdependence between age and what is on the subject line that affects this target? Ranka, like Thomas, simply does not address these questions. In fact, Ranka makes no effort whatsoever to dynamically segment the recipient population and optimize what is sent to each portion of the recipient population.

Given the above background, what is needed in the art are improved systems and methods for optimizing e-mail campaigns.

Discussion or citation of a reference herein will not be construed as an admission that such reference is prior to the present disclosure.

SUMMARY OF THE DISCLOSURE

The present disclosure addresses the need for improved systems and methods for optimizing digital message campaigns through path optimization. Exemplary digital messages include, but are not limited to, multimedia message service (MMS) messages, enhanced message service (EMS) messages, short message service (SMS) messages, e-mail, Internet-based instant messaging service (IMS) messages, and exchange instant messaging (EIM) messages, to name a few.

In the present disclosure, a method, performed by one or more processors, is provided for path optimization for a message campaign. A graphical user interface representation of the message campaign is displayed. The message campaign is electronically connected to one or more sources of destination target information. The one or more sources of destination target information collectively define a plurality of destination targets. A plurality of sets of input instructions is received. Each respective set of input instructions in the plurality of sets of input instructions corresponds to a path in a plurality of paths in the message campaign. The plurality of sets of input instructions are then executed, thereby causing, for each respective set of input instructions in the plurality of sets of input instructions, a different subset of electronic messages in a first plurality of electronic messages to be sent according to a corresponding path in the plurality of paths to a different subset of destination targets in the plurality of destination targets. In response to the executing step, responses or results of executing the plurality of sets of input instructions are monitored. A winning path is then determined from among the plurality of paths based on a path discriminator. The path discriminator uses (i) a correlation of a criterion with a goal for the message campaign for each respective set of input instructions in the plurality of sets of input instructions and also (ii) the responses or results of executing the plurality of sets of input instructions. In response to the determining, the winning path from among the plurality of paths is upweighted. Then, the message campaign uses the upweighted winning path by causing a second plurality of electronic messages to be sent through the winning path to destination targets in the plurality of destination targets.

In another aspect of the present disclosure, a computer system for performing path optimization for a message campaign is disclosed. The computer system comprises a processor and a memory. The memory comprises instructions executable by the processor for displaying a graphical user interface representation of the message campaign. The message campaign is electronically connected to one or more sources of destination target information. The one or more sources of destination target information collectively define a plurality of destination targets. The instructions are further executable by the processor for receiving a plurality of sets of input instructions, each respective set of input instructions in the plurality of sets of input instructions corresponding to a path in a plurality of paths in the message campaign. The instructions are also executable by the processor for executing the plurality of sets of input instructions thereby causing, for each respective set of input instructions in the plurality of sets of input instructions, a different subset of electronic messages in a first plurality of electronic messages to be sent according to a corresponding path in the plurality of paths to a different subset of destination targets in the plurality of destination targets. The instructions are also executable by the processor for monitoring, responsive to the executing step, responses or results of executing the plurality of sets of input instructions. The instructions are also executable by the processor for determining a winning path from among the plurality of paths based on a path discriminator. Here, the path discriminator uses (a) a correlation of a criterion with a goal for the message campaign for each respective set of input instructions in the plurality of sets of input instructions and (b) the responses or results of executing the plurality of sets of input instructions. For instance, the path discriminator identifies a correlation of a criterion with a goal for the message campaign across the responses or results of executing the plurality of sets of input instructions (e.g., using Bayesian techniques). The instructions are also executable by the processor for upweighting, responsive to the determining, the winning path from among the plurality of paths. Last, the instructions are also executable by the processor for using the message campaign with the upweighted winning path by causing a second plurality of electronic messages to be sent through the winning path to destination targets in the plurality of destination targets.

In yet another aspect of the present disclosure, a non-transitory computer readable medium comprising instructions to perform a method for path optimization for a message campaign is disclosed. The method is performed by one more processors and comprises displaying a graphical user interface representation of the message campaign. The message campaign is electronically connected to one or more sources of destination target information. The one or more sources of destination target information collectively define a plurality of destination targets. The method further comprises receiving a plurality of sets of input instructions. Each respective set of input instructions in the plurality of sets of input instructions corresponds to a path in a plurality of paths in the message campaign. The method further comprises executing the plurality of sets of input instructions thereby causing, for each respective set of input instructions in the plurality of sets of input instructions, a different subset of electronic messages in a first plurality of electronic messages to be sent according to a corresponding path in the plurality of paths to a different subset of destination targets in the plurality of destination targets. The method further comprises monitoring, responsive to the executing step, responses or results of executing the plurality of sets of input instructions. The method further comprises determining a winning path from among the plurality of paths based on a path discriminator. The path discriminator uses (a) a correlation of a criterion with a goal for the message campaign for each respective set of input instructions in the plurality of sets of input instructions and (b) the responses or results of executing the plurality of sets of input instructions. The method further comprises upweighting, responsive to the determining, the winning path from among the plurality of paths and using the message campaign with the upweighted winning path by causing a second plurality of electronic messages to be sent through the winning path to destination targets in the plurality of destination targets.

In some embodiments of the present disclosure, a first path in the plurality of paths comprises a plurality of steps and one or more input nodes. An input node in the one or more input nodes corresponds to a step in the plurality of steps. In some embodiments, determining the winning path is performed without human intervention. In some embodiments, a path in the plurality of paths comprises a subpath branching from a decision block. In some embodiments, the graphical user interface representation includes a drag and drop capability for receiving a set of input instructions in the plurality of sets of input instructions. In some embodiments, the graphical user interface representation includes a configuration screen. In some embodiments, the graphical user interface representation includes a graphical mechanism for receiving an override input, where, when the override input is received, the winning path of the determining step is overridden with a manual selection of a path in the plurality of paths that is designated by the override input. In some embodiments, determining the winning path includes comparing a number of user clicks, opens, or conversions uniquely associated with each path in the plurality of paths. In some embodiments, determining the winning path requires a number of responses or results that exceeds a predetermined sample size threshold. In some embodiments, the present disclosure comprises repeating at a later time the executing, monitoring, determining and upweighting, thereby selecting a new winning path from among the plurality of paths. In some embodiments, upweighting the winning path causes a path in the plurality of paths other than the winning path to not be implemented in the message campaign during the using step. In some embodiments, upweighting the winning path causes the winning path to be used more often than a path that is not the winning path while still allowing for the path that is not the winning path to be used for a portion of the electronic messages in the second plurality of electronic messages. In some embodiments, an electronic message in the first plurality of messages is an E-mail message. In some embodiments, the one or more sources of destination target information comprise a database, a spreadsheet, or a web service feed.

BRIEF DESCRIPTION OF THE DRAWINGS

FIG. 10 is a graphical illustration of how a path can have branching subpaths.

Like reference numerals refer to corresponding parts throughout the several views of the drawings.

DETAILED DESCRIPTION

Figure 1:
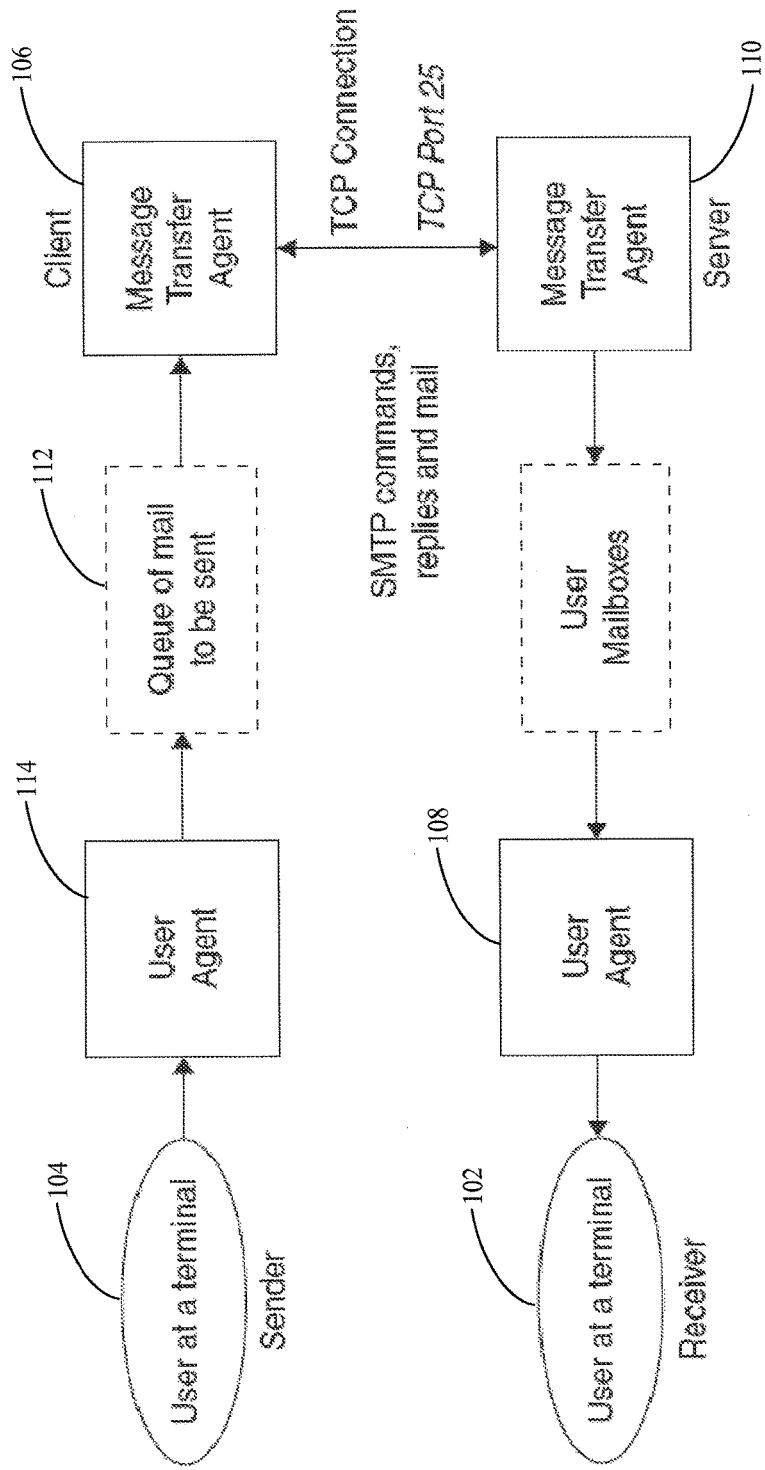
FIG. 1 is the basic simple mail transfer protocol (SMTP) model in accordance with the prior art.
Figure 2:
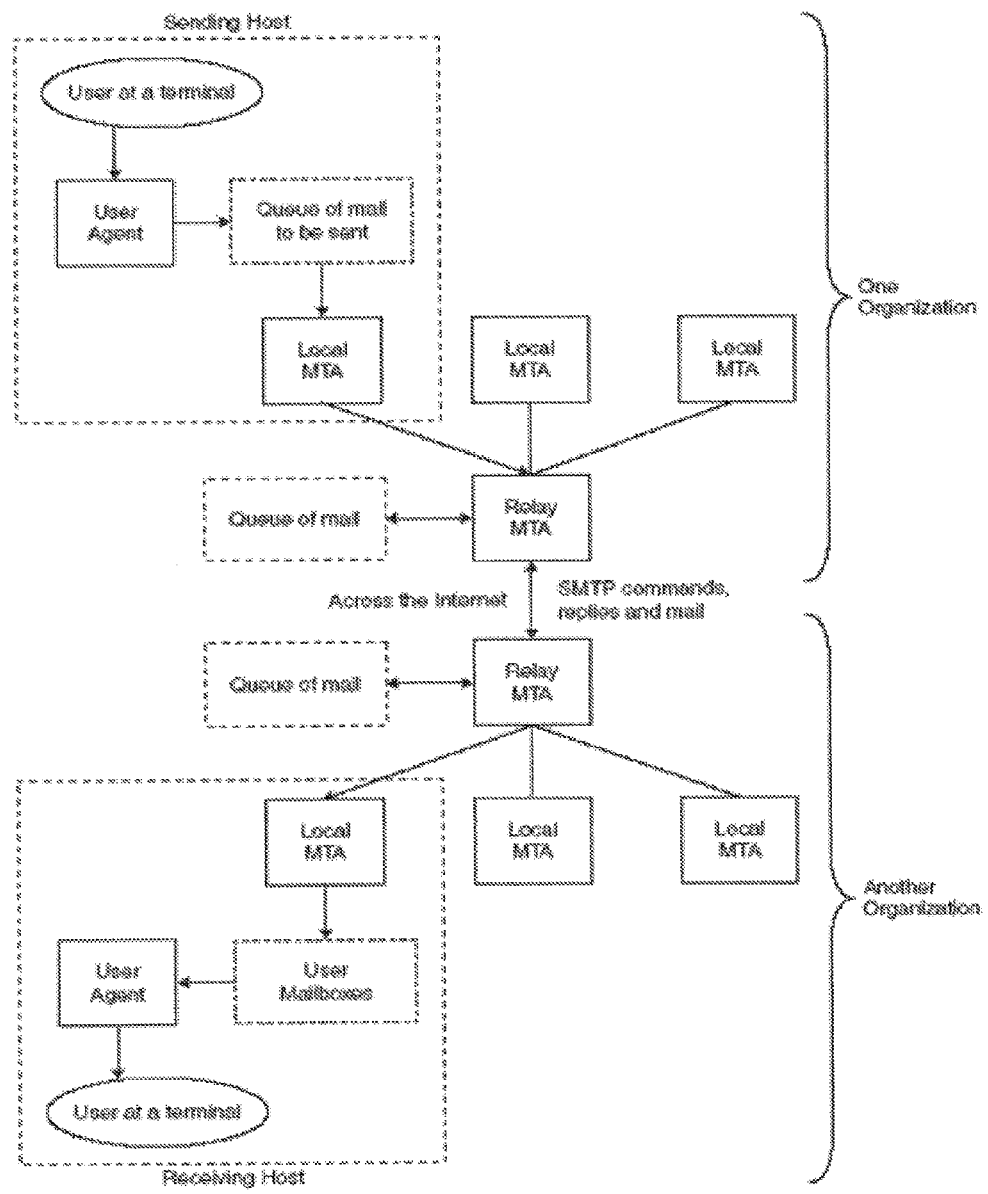
FIG. 2 is the simple mail transfer protocol (SMTP) model with relay mail transfer agents in accordance with the prior art.

The present disclosure is directed to systems and methods for path optimization in a computer based digital message campaign using computer based processing. A first plurality of digital message addresses of a first plurality of targeted recipients are electronically accessed from one or more data structures containing digital message addresses (e.g., e-mail addresses) of the first plurality of targeted recipients. A first plurality of digital messages (e.g., marketing messages in the form of e-mail) is created.

Each digital message in the first plurality of digital messages comprises a plurality of elements independently selected from a library of elements based on one or more campaign rules. Examples of elements include, but are not limited to, a predetermined subject line, a text message, a graphic, a clickable hyperlink, a position of a text message in a digital message, a position of a graphic in a digital message, a position of a clickable hyperlink in a digital message, a background color of a digital message, a font used in a digital message, a point size for text in a digital message, a video clip, a position of a video clip in a digital message, a quality of a video clip in a digital message, or a compression format of a video clip in a digital message.

An example of a campaign rule is to require that a particular element in the library of elements be incorporated into a plurality of digital messages with a predetermined frequency or frequency range. For instance, in the case where the element is a subject line of a digital message (in those digital messages that have a subject line), a given campaign rule may require that a particular subject line (e.g., "Sale starts Thursday") be used in at least thirty, forty, fifty, sixty, seventy, eighty or ninety percent of the digital messages in the plurality of digital messages. In another example, a given campaign rule may require that a particular subject line (e.g., "Sale starts Thursday") be used in between forty percent and eighty percent of the digital messages in the plurality of digital messages.

The first plurality of digital messages is sent from a server, such as an e-mail server, over an electronic network to the first plurality of digital message addresses of the first plurality of targeted recipients. In some embodiments, the first plurality of digital messages is sent using a digital message server (e.g., a mail transfer agent (MTA)) (or plurality of servers). In some embodiments, the server (or plurality of servers) optionally keeps a profile for each domain (or site) or set of domains (or set of sites) to which the server (or plurality of servers) routinely sends digital messages.

Each respective optional profile contains one or more parameters that dictate the conditions under which digital messages can be sent to the domain (or site) associated with the respective optional profile (e.g., number of digital message per day, etc.). The digital message server provides digital message service using any available electronic means such as, for example, SMTP, POP3, X.400, ESMTP or MHS protocol or a logical variant thereof (e.g., a program similar to or derived from SMTP, POP3, X.400, ESMTP or MHS). For a general reference regarding digital message protocols, see Hughes, 1998, *Internet E-mail: Protocols, Standards, and Implementation*, Artech House Publishers, which is hereby incorporated herein by reference herein in its entirety.

Upon receipt of the digital messages, the digital message server determines the destination domain (or site) for the digital messages. The digital message server then optionally reads the optional profile for the destination domain (or site) and determines what rules apply for sending the digital messages to the destination domains (or site). If permitted by the optional profile, the digital message server sends the digital message to the destination domain. The digital message server further optionally monitors progress sending digital messages to destination domains (or destination sites).

At least one selected response event occurring after the first plurality of digital messages is sent to the first plurality of digital message addresses of the first plurality of targeted recipients is electronically tracked. Examples, of response events include, but are not limited to a deliverability rate, a digital message open rate, a click through rate, a conversion rate, a purchase rate, a reply rate, and an unsubscribe rate.

The initial sending of the messages and the tracking of the responses is sometimes referred to as the "test period." The goal of the test period is to determine which path is the optimum path for conducting a message campaign. After a winner has been determined, the message campaign is configured such that messages are sent to target recipients via the winning path.

Next, in some embodiments, the library of elements is segmented based upon one or more relationships between (i) differences in usages of elements in the first plurality of digital messages and (ii) the at least one selected response event, thereby discovering a relationship result. These one or more relationships are discovered by analysis of the first plurality of digital messages as disclosed in more detail below.

In some embodiments, a determination is made as to whether (i) a variation in the presence or absence of a first element across the first plurality of digital messages and (ii) a variation in the performance of the at least one selected response events across the first plurality of targeted recipients are correlated conditional on a variation in one or more demographics across the first plurality of targeted recipients. For example, consider the case where:

1) the absence or presence of a particular digital message and the variation in the performance of the at least one selected response event are highly correlated for those digital messages sent to recipients that are age fifty or older, and 2) the absence or presence of a particular digital message and the variation in the performance of the at least one selected response event are not correlated at all for those digital messages sent to recipients that are less than fifty years of age.

In this example, the (i) a variation in the presence or absence of a first element across the first plurality of digital messages and (ii) a variation in the performance of the at least one selected response events across the first plurality of targeted recipients are correlated conditional on the age of targeted recipients (over fifty or under fifty). In this simple example, the demographic is treated as a categorical variable for the sake of illustration. However, there is no requirement that the demographic be a categorical variable. Rather, in some embodiments, the embodiment is a quantitative variable (e.g., absolute age of recipient as opposed to an age category such as greater or less than 50).

The discovered relationships or discovered correlation conditional relationships described above are used in some embodiments to modify at least one of the one or more campaign rules for the campaign based upon the relationship result. In some embodiments the modification is done without human intervention (e.g., automatically). In some embodiments the modification is done with human intervention (e.g., not automatically).

The discovered relationships or discovered conditional correlation relationships described above are used in some embodiments to create a campaign rule to be added to the one or more campaign rules for the campaign. In some embodiments this is done without human intervention (e.g., automatically). In some embodiments this is done with human intervention (e.g., not automatically).

Next, a second plurality of digital message addresses of a second plurality of targeted recipients is electronically accessed from one or more data structures containing digital message addresses of a second plurality of targeted recipients. A second plurality of digital messages is created. Each digital message in the second plurality of digital messages comprises a plurality of elements independently selected from the library of elements based on the one or more campaign rules which have now been modified as described above.

The second plurality of digital messages is sent from an e-mail server over an electronic network to the second plurality of digital message addresses of the second plurality of targeted recipients. In some embodiments, this relationship discovery and campaign rule modification or creation continues on an ongoing basis throughout the campaign. In some embodiments, this relationship discovery and campaign rule modification or creation continues on an ongoing basis throughout the campaign and after the campaign.

As used herein, the term "correlation" is used to mean any statistically significant relationship. The correlation can be found by computation of a distance metric, or by performing other forms of tests, such as t-test, regression, and any of the other pattern classification techniques disclosed herein and known to those of skill in the art. In some embodiments, there is a correlation if such a test discloses a result that has a p value of 0.1 or less, .05 or less, 0.001 or less or 0.0001 or less. However, many of the tests disclosed herein do not necessarily provide a p value and in such instances a correlation is deemed to exist using any art recognized metric and threshold for such tests. As such, the term "correlation", in preferred embodiments, is not limited to the computation of a correlation coefficient or other similarity metric.

Exemplary Systems

Now that an overview has been provided, an exemplary system that supports the functionality described above is provided in conjunction with FIG. 3. The system is preferably a computer system 10 having:

a central processing unit 22;

a main non-volatile storage unit 14, for example, a hard disk drive, for storing software and data, the storage unit 14 controlled by controller 12;

a system memory 36, preferably high speed random-access memory (RAM), for storing system control programs, data, and application programs, comprising programs and data loaded from non-volatile storage unit 14; system memory 36 may also include read-only memory (ROM);

a user interface 32, comprising one or more input devices (e.g., keyboard 28) and a display 26 or other output device;

a network interface card 20 or other communication circuitry for connecting to any wired or wireless communication network 34 (e.g., the Internet or any other wide area network);

an internal bus 30 for interconnecting the aforementioned elements of the system; and a power source 24 to power the aforementioned elements.

Operation of computer 10 is controlled primarily by operating system 40, which is executed by central processing unit 22. Operating system 40 can be stored in system memory 36. In addition to operating system 40, in a typical implementation, system memory 36 can include one or more of the following:

file system 42 for controlling access to the various files and data structures;

a digital message (e.g. transfer agent (MTA)) module 44 for processing a plurality of digital messages that are being sent to recipients at a plurality of destination domains (or sites);

a digital message data store 46, which can comprise one or more data structures, for storing information about a plurality of targeted recipients 48, for each of the respective targeted recipients 48, the digital message data store 46 storing a digital message address 50 (e.g., e-mail address) and, optionally, one or more demographics 52 about the respective targeted recipient 48;

a digital message campaign generation module 56 for creating a plurality of digital messages (e.g., e-mails with a destination e-mail address) 68, each digital message 68 in the plurality of digital messages comprising a plurality of elements independently selected from a library of elements based on one or more campaign rules 58, and each respective digital message 68 in the plurality of digital messages having a targeted recipient 48 and being sent to the targeted recipient 48 based on a path 60 defined by one or more user input instructions 62;

a campaign performance tracking module 66 for electronically tracking at least one selected response event 70 occurring after a plurality of digital messages 68 is sent to a plurality of digital message addresses 50 of a plurality of targeted recipients 48;

a segmentation/correlation module 80 for (A) segmenting a library of elements 90 based upon one or more relationships between (i) differences in user input instructions 62 of different paths 60 corresponding to a plurality of digital messages and (ii) the at least one selected response event 70, thereby discovering a relationship result or (B) determining whether (i) a variation in the user input instructions 62 in a plurality of digital messages 68 and (ii) a variation in the performance of the at least one selected response event 70 across a plurality of targeted recipients 64 are correlated conditional on a variation in the one or more demographics 52 across the plurality of targeted recipients 48;

a campaign rule modification/creation module 84 for modifying at least one campaign rule 58 of the one or more campaign rules for a campaign based upon a relationship result derived by the segmentation/correlation module 80 and/or for creating a campaign rule 58 to be added to the one or more campaign rules for a campaign;

a path discriminator module 86 for determining a winning path among a plurality of paths 60 based on a correlation between a criterion 87 and a goal of the message campaign defined by campaign rules 58, as well as the responses 70 to messages 68 sent according to paths 60;

a message campaign coordination module 88 to upweight a winning path determined by the path discriminator module 86 and to coordinate a message campaign via the winning path;

a graphical user interface 89 for graphically representing the message campaign to a user; and a library elements 90, each element in the library of elements 90 specifying, for example, a predetermined subject line, a text message, a graphic, a clickable hyperlink, a position of a text message in a digital message, a position of a graphic in a digital message, a position of a clickable hyperlink in a digital message, a background color of a digital message, a font used in a digital message, a point size for text in a digital message, a video clip, a position of a video clip in a digital message, a quality of a video clip in a digital message, or a compression format of a video clip in a digital message.

Figure 3:
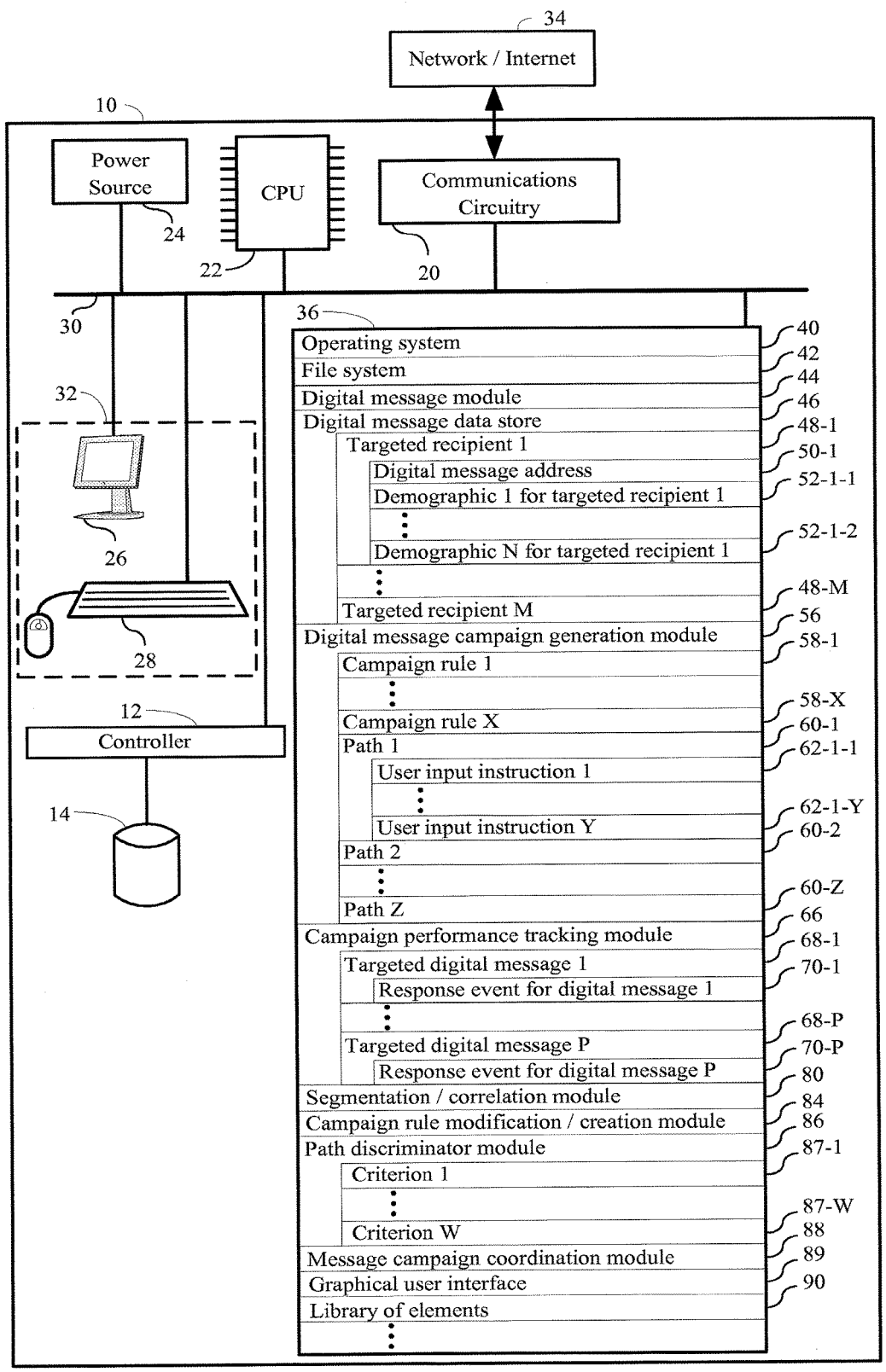
FIG. 3 is a server for path optimization in a computer based digital message campaign using computer based processing in accordance with some embodiments.

As illustrated in FIG. 3, computer 10 comprises software program modules and data structures. The data structures stored in computer 10 include, for example, digital message data store 46 and the library of elements 90. Each of these data structures can comprise any form of data storage including, but not limited to, a flat ASCII or binary file, an Excel spreadsheet, a relational database (SQL), or an on-line analytical processing (OLAP) database (MDX and/or variants thereof). In some embodiments, the information in digital message data store 46 and library of elements 90 are each a single data structure. In some embodiments, digital message data store 46 and/or library of elements 90, in fact, comprises a plurality of data structures (e.g., databases, files, archives) that may or may not all be hosted by computer 10. For example, in some embodiments, digital message data store 46 and/or library of elements 90 comprises a plurality of structured and/or unstructured data records that are stored either on computer 10 and/or on computers that are addressable by computer 10 across network/Internet 34.

In some embodiments, digital message data store 46 and/or library of elements 90 are in a database that is either stored on computer 10 or are distributed across one or more computers that are addressable by computer 10 by network/

Internet 34. Thus, in some embodiments, one or more of such data structures is hosted by one or more remote computers (not shown). Such remote computers can be located in a remote location or in the same room or the same building as computer 10. In some embodiments, the software modules illustrated in FIG. 3 are stored in computer 10. In some embodiments, all or a portion of one or more of the software modules illustrated in FIG. 3 are not stored in computer 10 but rather are stored in one or more computers or electronic storage devices that are addressable by computer 10. As such, any arrangement of the data structures and software modules illustrated in FIG. 3 on one or more computers is within the scope of the disclosure so long as these data structures and software modules are addressable by computer 10 across network/Internet 34 or by other electronic means. Moreover, other systems, application modules and databases not shown in FIG. 3 can be stored in system memory 36. Thus, the present disclosure fully encompasses a broad array of computer systems. Moreover, computer 10 may in fact comprise a plurality of servers that are in electrical communication with each other and that each contains one or more of the software modules and/or data structures illustrated in FIG. 3.

Exemplary Methods

Figure 4:
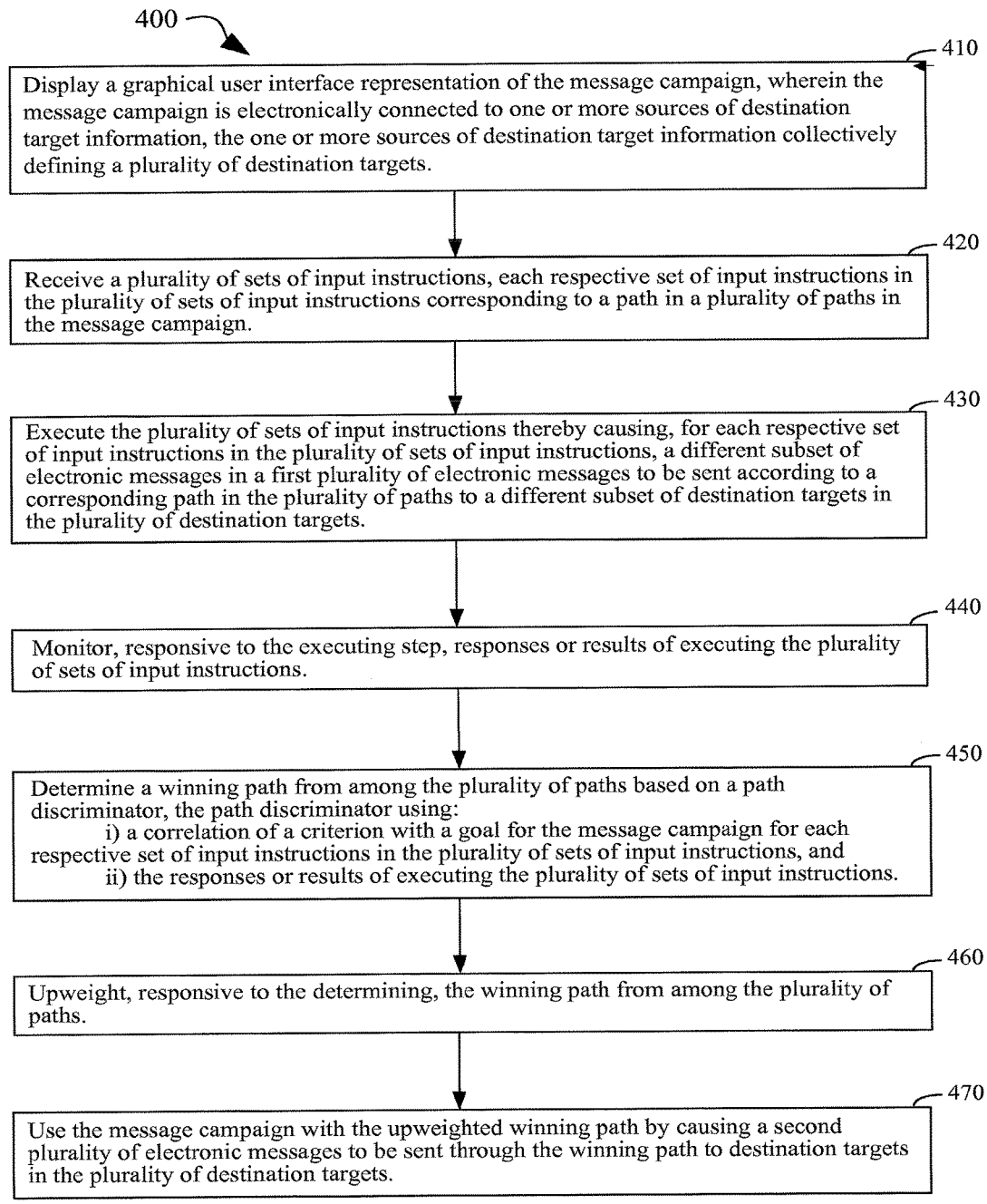
FIG. 4 is a flow diagram of a method for path optimization in a computer based digital message campaign using computer based processing in accordance with some embodiments.

Now that an overview of a system in accordance with one embodiment of the present disclosure has been described, various advantageous methods that can be used in accordance with the present disclosure will now be disclosed in conjunction with FIGS. 3 and 4. In particular, FIG. 4 provides a general overview of a method 400 for path optimization in a computer based e-mail marketing campaign using computer based processing. The term "optimization" is used to describe the attempt to improve performance, although those workers having ordinary skill in the art will appreciate that while there may be only a single "optimum" which may not always be attained, there are many degrees of performance improvement that may be obtained. As used in this description, optimization conveniently means improvement rather than requiring attainment of any single optimum value. Put differently, optimization refers to procedures, algorithms, and other attempts to attain optimum performance rather than requiring that the optimum performance be attained.

In step 410, a representation of the message campaign is displayed on a graphical user interface 89. The message campaign is electronically connected to one or more sources of destination target information, with each of the one or more sources of destination target information collectively defining a plurality of destination targets 48. In some implementations, graphical user interface 89 is generated using the message campaign coordination module 88. In some embodiments, graphical user interface 89 includes drag and drop capabilities for designing and constructing different elements of the message campaign. In some embodiments, graphical user interface 89 includes a configuration screen where a user can set up and input goals and rules of the campaign. In some implementations, the message campaign includes one or more nodes, created by the user, with each respective node representing a particular step, e.g. action or decision. In some implementations, a path in the campaign is created using one or more nodes and connectors, e.g. lines or arrows, connecting the one or more nodes. In some embodiments, the one or more sources of destination target information comprise a database, a spreadsheet, or a web service feed.

In step 420 a user inputs a plurality of sets of instructions 62 into the message campaign graphical user interface 89. Each respective set of input instructions 62 in the plurality of sets of input instructions corresponds to a path 60 in a plurality of paths in the message campaign. In some embodiments, a different digital message 68 is created for each different type of path 60. In other embodiments, each path 62 uses the same digital message 68 for control purposes. In some embodiments, one message 68 is created for each path 60. In other embodiments, multiple messages are created for each path. Each digital message 68 in the first plurality of digital messages comprises a plurality of elements independently selected from a library of elements 90 based on one or more campaign rules 58.

Examples of elements that can be included in a digital message in step 420 include, but are not limited to, a predetermined subject line, a text message, a graphic, a clickable hyperlink, a position of a text message in a digital message, a position of a graphic in a digital message, a position of a clickable hyperlink, a background color of a digital message, a font used in a digital message, a point size for text in a digital message, a video clip, a position of a video clip in a digital message, a quality of a video clip in a digital message, or a compression format of a video clip in a digital message.

In some embodiments, a campaign rule in the one or more campaign rules specifies an allowed percentage range for incorporation of an element or a combination of elements in the library of elements into a plurality of digital messages. For example, consider the case where the element is the use of a subject line that states "Sale starts Thursday" and the campaign rule states that this element may be used between 10 and 30 percent of the time in a plurality of digital messages. Accordingly, when the plurality of digital messages is created, between 10 and 30 percent of the digital messages will have the subject line "Sale starts Thursday."

In some embodiments, a campaign rule in the one or more campaign rules specifies an allowed percentage of time for incorporation of an element or a combination of elements in the library of elements into a plurality of digital messages. For example, consider the case where the element is again the use of a subject line that states "Sale starts Thursday" and the campaign rule states that this element may be used 30 percent of the time in a plurality of digital messages. Accordingly, when the plurality of digital messages is created, exactly 30 percent of the digital messages will have the subject line "Sale starts Thursday."

In some embodiments, specification of a range of allowed usage of an element is advantageous in order to accommodate other additional campaign rules. For example, the campaign may have a first campaign rule that specifies an allowed percentage range for a first element and a second campaign rule that specifies an allowed percentage range for a combination of elements that includes the first elements. By having allowed ranges, it is possible to accommodate both rules. In more complex examples, additional logic can be built into campaign rules. For example, one campaign rule may state to incorporate a given element into digital messages if another campaign rule is present, but to not incorporate a given element into digital messages of another campaign rule is not present. Moreover, in some embodiments, conditional logic can be built into the campaign rules. For example, a campaign rule may specify to incorporate an element or combination of elements into a plurality of digital messages with a first probability range if the day of week is Saturday, and to incorporate an element or combination of elements into a plurality of digital messages with a second probability range if the day of week is any other day but Saturday.

In some embodiments, a campaign rule in the one or more campaign rules specifies a probability that an element or a combination of elements in the library of elements is to be incorporated into a digital message in a plurality of digital messages. In some embodiments, a campaign rule in the one or more campaign rules specifies an allowed number of times or an allowed range of times an element or a combination of elements in the library of elements can be incorporated into a plurality of digital messages.

In some embodiments, a campaign has two or more campaign rules, three or more campaign rules, five or more campaign rules, or ten or more campaign rules. In some embodiments, a campaign rule operates on a combination of elements. In some embodiments, the combination of elements is two or more elements, three or more elements, five or more elements, ten or more elements, or one hundred or more elements.

In step 430, digital message campaign generation module executes the plurality of sets of input instructions 62 thereby causing, for each respective set of input instructions in the plurality of sets of input instructions, a different subset of electronic messages 68 in a first plurality of electronic messages to be sent according to a corresponding path 60 in the plurality of paths to a different subset of destination targets 48 in the plurality of destination targets. In some embodiments, the electronic messages are emails. In other embodiments, the electronic messages are other forms of digital communication, such as text messages, instant messages, and social media posts. The first plurality of digital messages is sent from a server 10 over an electronic network 34 to the first plurality of digital message addresses 50 of the first plurality of targeted recipients 48. In some embodiments, each digital message includes text, markup language (e.g., HTML, WML, BHTML, RDF/XML, RSS, MathML, XHTML, SVG, cXML or XML), or other scripts or objects. In some embodiments, some of the text or other scripts or objects are elements whose absence or presence in any given digital message is regulated by the one or more campaign rules and some of the text or other scripts or objects are elements are not regulated by the one or more campaign rules. Thus, each digital message may have "constant" elements (text, scripts, objects, video, etc.) that appear in each respective digital message in the plurality of digital messages and "variable" elements that only appear in some of the digital messages, where the absence or presence of the "variable" elements is regulated by the one or more campaign rules.

In some embodiments, paths 60 dictate what kind of messages are sent, how many are sent, how they are to be sent, in what interval or order or frequency they are to be sent, and to whom the messages are sent. As discussed above, paths 60 comprise user input instructions 62. For example, one path 60-1 can comprise user input instruction 62-1-1 instructing the message campaign coordination module 88 to send out one email per hour to target recipients A, B, and C. As another example, a path can comprise user input instructions instructing the message campaign coordination module 88 to send out one and only one message to target recipients D and E. In some embodiments, a path comprises a subpath branching from a decision block. For example, Path1, illustrated in FIG. 10, has two subpaths "Email-Yes-Path" and "Email-No-Path".

In step 440, campaign performance tracking module 66 monitors, responsive to executing step 430, responses or results of executing the plurality of sets of input instructions. Nonlimiting examples of response events include, but are not limited to, a deliverability rate, a digital message open rate, a click through rate, a conversion rate, a purchase rate, a reply rate, and an unsubscribe rate. Of interest is the performance of the at least one selected response event. For example, in the case where the at least one selected response event is a deliverability rate, what is of interest is the percentage of the first plurality of digital messages that are successfully delivered to the targeted recipients. In the case where the at least one selected response event is a digital message open rate, what is of interest is the percentage of the first plurality of digital message mails of a particular path that were opened (e.g., read) by the targeted recipients. In the case where the at least one selected response event is a click through rate, what is of interest is the percentage of the first plurality of digital messages of a particular path in which the targeted recipients clicked on a challenge presented by the digital message (e.g., accepted a user agreement challenge), and so forth. In preferred embodiments, what is tracked is not only an overall performance of the selected response event among the first plurality of digital messages but, also, which specific digital messages in the first plurality of digital messages had a successful response event and which digital messages in the first plurality of digital messages did not have a successful response event. More specifically, in preferred embodiments, what is tracked is which digital messages sent in accordance to a particular path had a successful response event and which digital messages sent in accordance to a particular path did not have a successful response event. For the example path above, Path1, an exemplary instance of tracked performance of Path1 is illustrated below:

Email 1—100 Sent and 20 Clicks
    Email 2—100 Sent and 30 Clicks
    Email-Yes-Path—50 Sent and 10 Clicks
    Email-No-Path—50 Sent and 10 Clicks In step 450, path discriminator module 86 determines a winning path from among the plurality of paths based on: i) a correlation of a criterion 87 with a goal for the message campaign based on campaign rules 58, and ii) the responses or results 70 of executing the plurality of sets of input instructions 62. For example, in some embodiments the path discriminator identifies a correlation of a criterion 87 with a goal for the message campaign based on campaign rules 58 across the responses or results 70 of executing the plurality of sets of input instructions. In such embodiments, the path that yields a correlation that is greater than any other path is deemed to be the winning path. Examples of criteria 87 are maximizing open rates, maximizing click rates, and maximizing conversion rates. In some embodiments, open rates are given by the formula:

$$\frac{\text{(average number of opens for the path)}}{\text{(average number of sent messages for path)}}.$$

In some embodiments, click rates are given by the formula:

$$\frac{\text{(average number of clicks for the path)}}{\text{(average number of sent messages for the path)}}.$$

In some embodiments, conversion rates are given by the formula:

$$\frac{\text{(average number of conversion for the path)}}{\text{(average number of sent messages for the path)}}.$$

For the exemplary instance of tracked performance of Path1, the click rate would be:

20+30+10+10=70 clicks, average=70/4=17.5 avg. clicks

100+100+50+50=300 sent, average=300/4=75 avg. sent click rate=17.5/75=23.3% or more simply: 70/300=23.3%

Thus, Path1 returns a click rate of 23.3% and if an alternative path Path2 returns a click rate of 21.4%, a winning criterion of maximizing the click rate, leads the path discriminator module 86 to choose Path1 as the winning path. In some embodiments, there can be multiple criteria with different weights associated with each criterion. In other embodiments, there is only one criterion.

In some embodiments, selecting the winning path is achieved automatically, or without human intervention. In some embodiments, determining the winning path requires a number of responses or results that exceeds a predetermined sample size threshold. In yet some other embodiments, determining the winning path is based on a time interval. In such implementations, the path with the largest number of responses is chosen to be the winner after a predetermined amount of time has elapsed. In yet some other embodiments, the winning path is chosen based on the first path to produce a certain number of responses of a specific kind, e.g. responses from people over the age of 50. In some embodiments, the graphical user interface 89 includes a graphical mechanism for receiving an override input, wherein, when the override input is received, the winning path of the determining step is overridden with a manual selection. In other words, some implementations include a "force winner" option that allows a user to manually select the "winning" path and force subsequent messages in the message campaign to be sent through the manually selected path. In other implementations, the graphical user interface 89 allows for manual selection of one or more paths to disqualify and eliminate from test period.

In step 460, message campaign coordination module 88 upweights, responsive to the determining in 450, the winning path from among the plurality of paths. In some implementations, this marks the end of the test period. In step 470, a second plurality of electronic messages is sent through the winning path to destination targets. In some implementations, all subsequent messages sent after the test period are sent through the winning path. In other implementations, a majority of messages are sent through the winning path. In other words, in some implementations the winning path is used more often in the using step than a path in the plurality of paths that is not the winning path and wherein the path that is not the winning path is used in the using step for a portion of the electronic messages in the second plurality of electronic messages. In yet some other embodiments, a certain percentage of the messages or a few selected messages are sent through the winning path.

In some embodiments, the test period results are reset after a certain period of time. In other embodiments, the graphical user interface 89 includes a manual reset option that allows a user to reset the system. After such a reset the test period begins again and a new winning path is chosen. Thus, in some embodiments, the executing, monitoring, determining and upweighting are repeated at a later time, thereby selecting a new winning path from among the plurality of paths.

Figure 5:
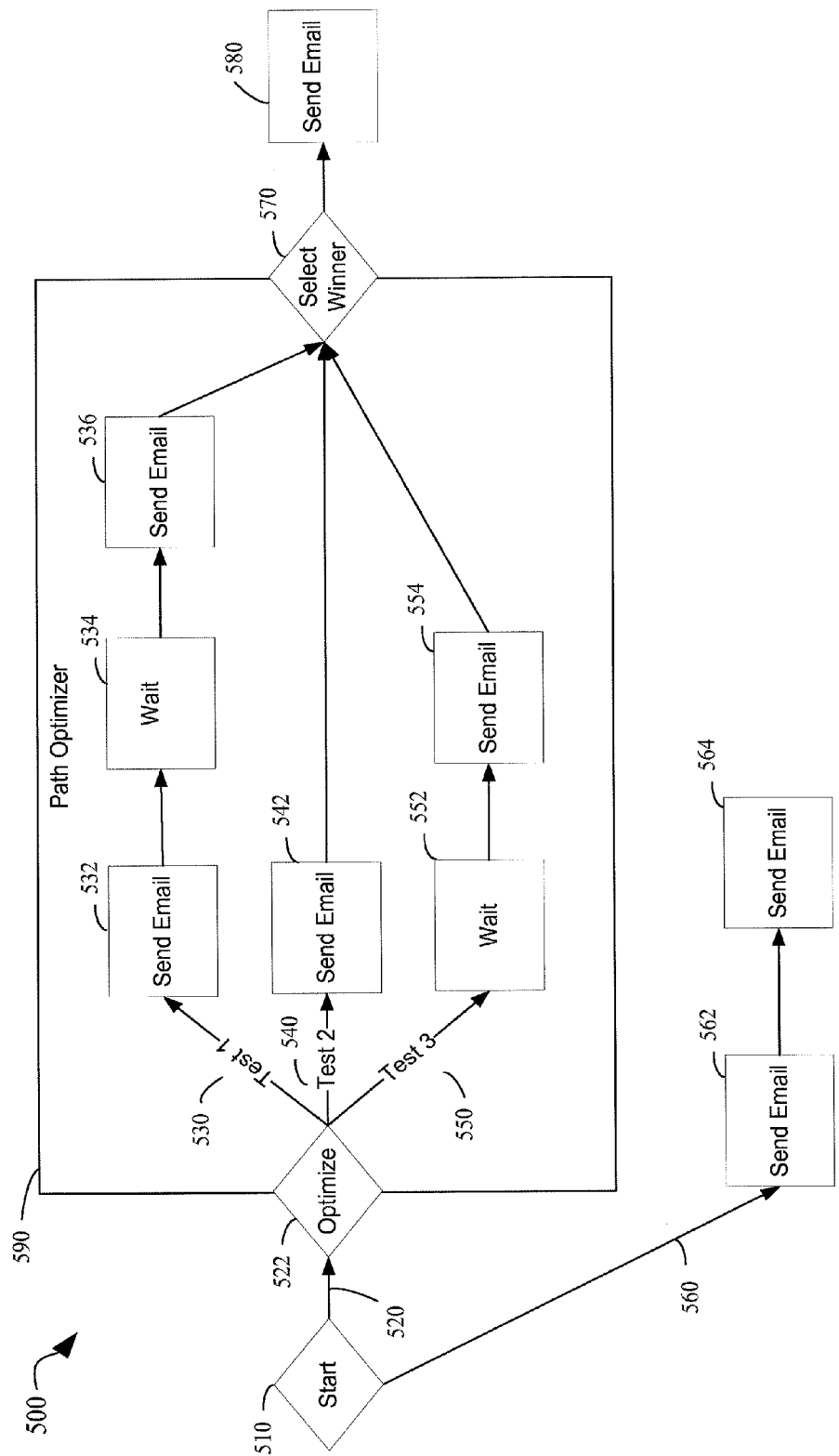
FIG. 5 is a graphical illustration of an exemplary implementation of a path optimizer in a computer based digital message campaign using computer based processing in accordance with some embodiments.

FIG. 5 is a is a graphical illustration of an exemplary implementation of a path optimizer in a computer based digital message campaign using computer based processing in accordance with some embodiments.

Message campaign 500 can be constructed by a user in a graphical user interface 89, and begins with start node 510. From there, the message campaign can take two different paths 520 and 560. Path 560 is a simple path and consists of two email sends (562 and 564). If the user chooses path 560, the message campaign simply sends two emails (562 and 564) and is complete. Path 520 branches into three subpaths, 530, 540, and 550, which the user has chosen to place in path optimizer 590, and ends with sending an email (580). One reason for using path optimizer 590 is to find out, through test runs, which subpath achieves the best results, given the goals of the message campaign. Path optimizer 590 is delineated by optimize node 522 and select winner node 570. All three subpaths, 530, 540, and 550 branch out from optimize node 522 and end at select winner node 570. Subpath 530 consists of sending an email (532), waiting (534), and sending another email (536). Subpath 540 simply consists of sending an email (542). Subpath 550 consists of first waiting (552) and then sending an email (554). Path optimizer 590 then runs tests in accordance with the method described in FIG. 4 and finds a winning subpath through which 520 will flow. After path optimizer 590 has selected a winning subpath, for example subpath 530, message campaign 500 will be run through path 560 and 520 (via winning subpath 530). It is important to note that path 560 lies outside path optimizer 590, meaning path optimizer 590 is optional and that a user can set up paths in campaign that are to be used in addition to the winning path chosen in path optimizer 590.

Figure 6:
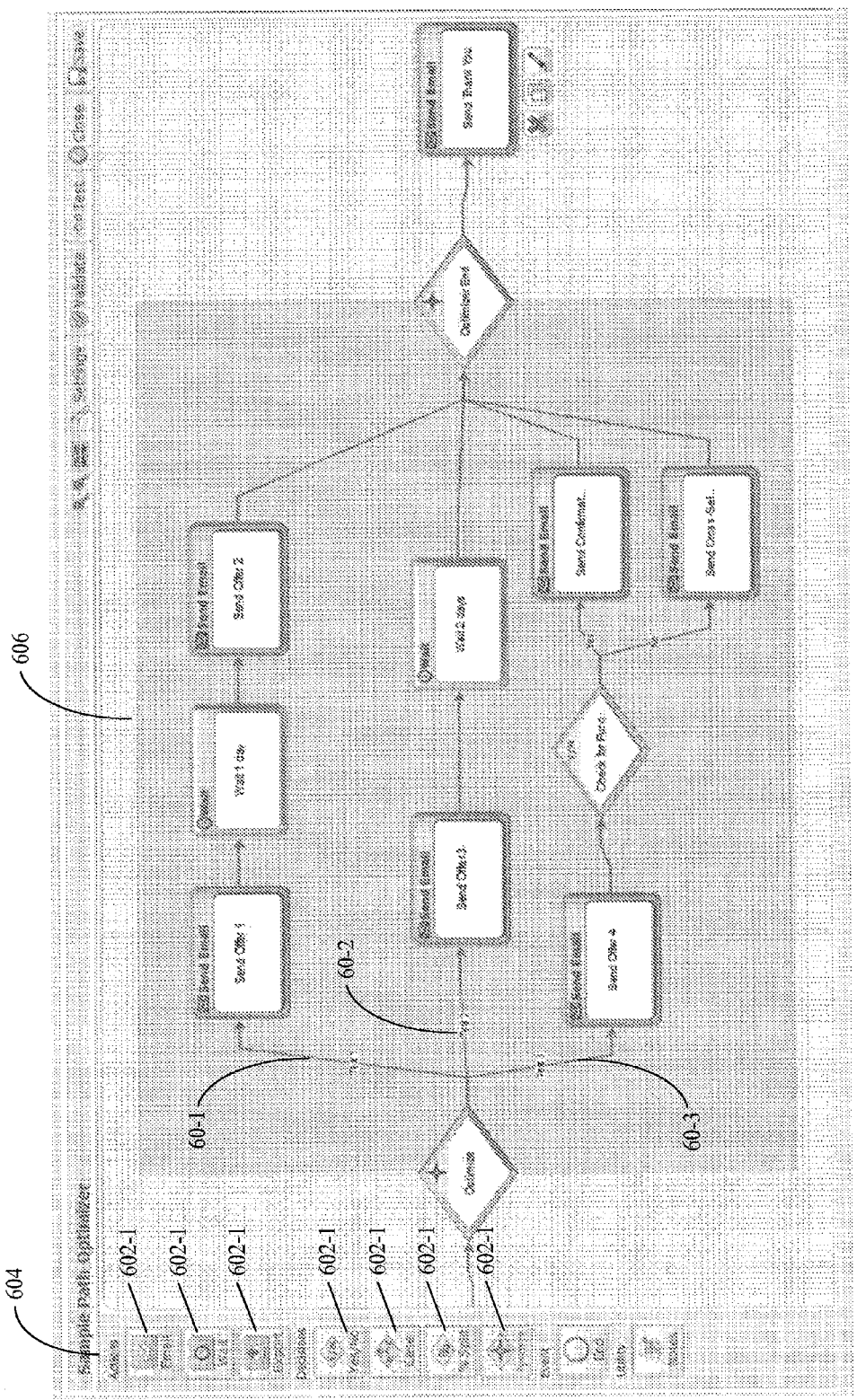
FIG. 6 is a graphical illustration of an exemplary implementation of a path optimizer in a computer based digital message campaign using computer based processing in accordance with some embodiments.

FIG. 6 is a is another graphical illustration of an exemplary implementation of a path optimizer in a computer based digital message campaign using computer based processing in accordance with some embodiments. Conveniently, a user can drag and drop decision and action blocks 602 from panel 604 onto the canvas 606 in order to build a complex set of paths 60.

Figure 7:
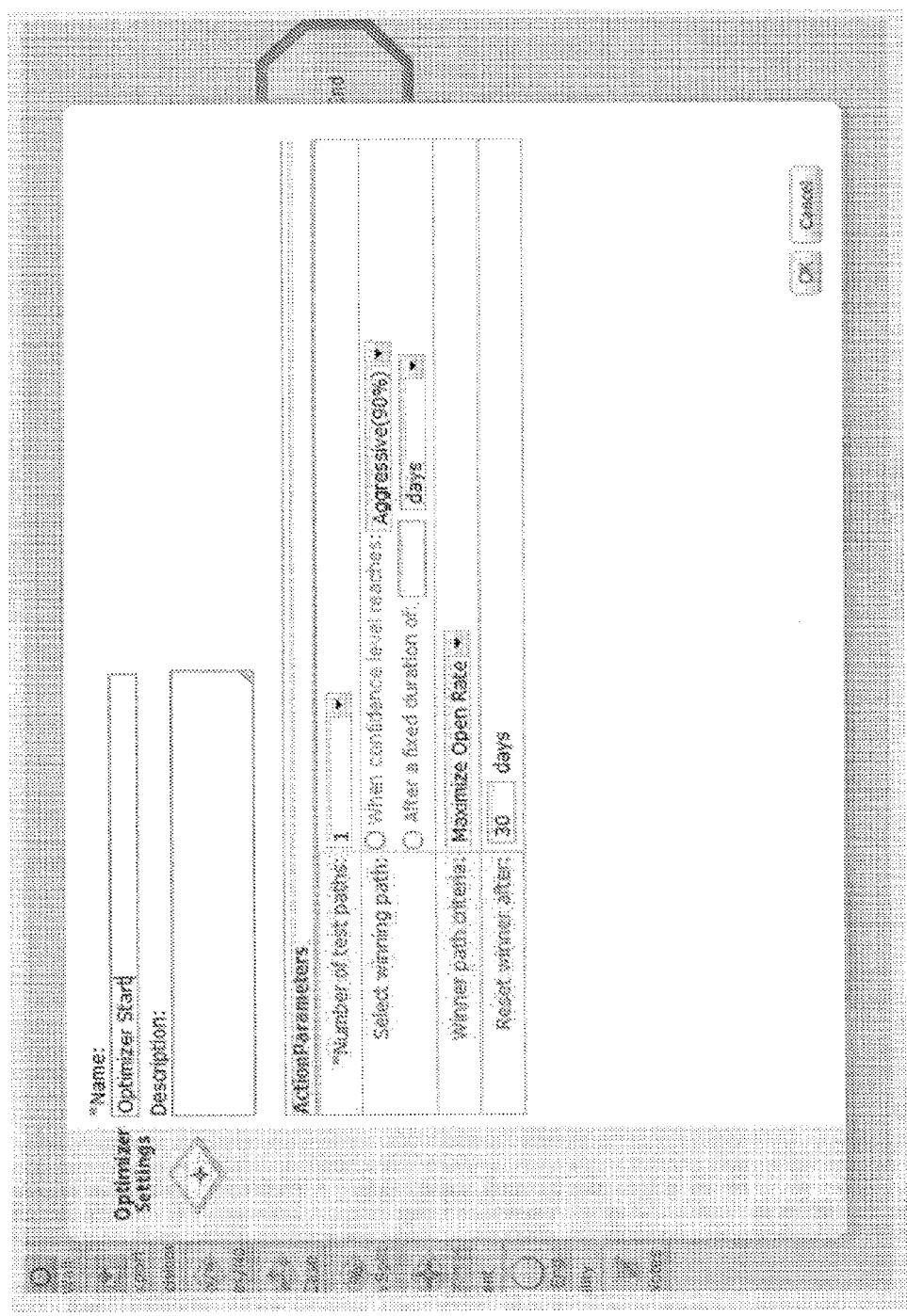
FIG. 7 is a graphical illustration of an interface for setting up a plurality of test paths for path optimization testing in accordance with some embodiments.

FIG. 7 is a graphical illustration of an interface for setting up a plurality of test paths for path optimization testing in accordance with some embodiments. Advantageously, the interface allows for the resetting of the rules after a predetermined time period so that a new winning path can be re-determined.

Figure 8:
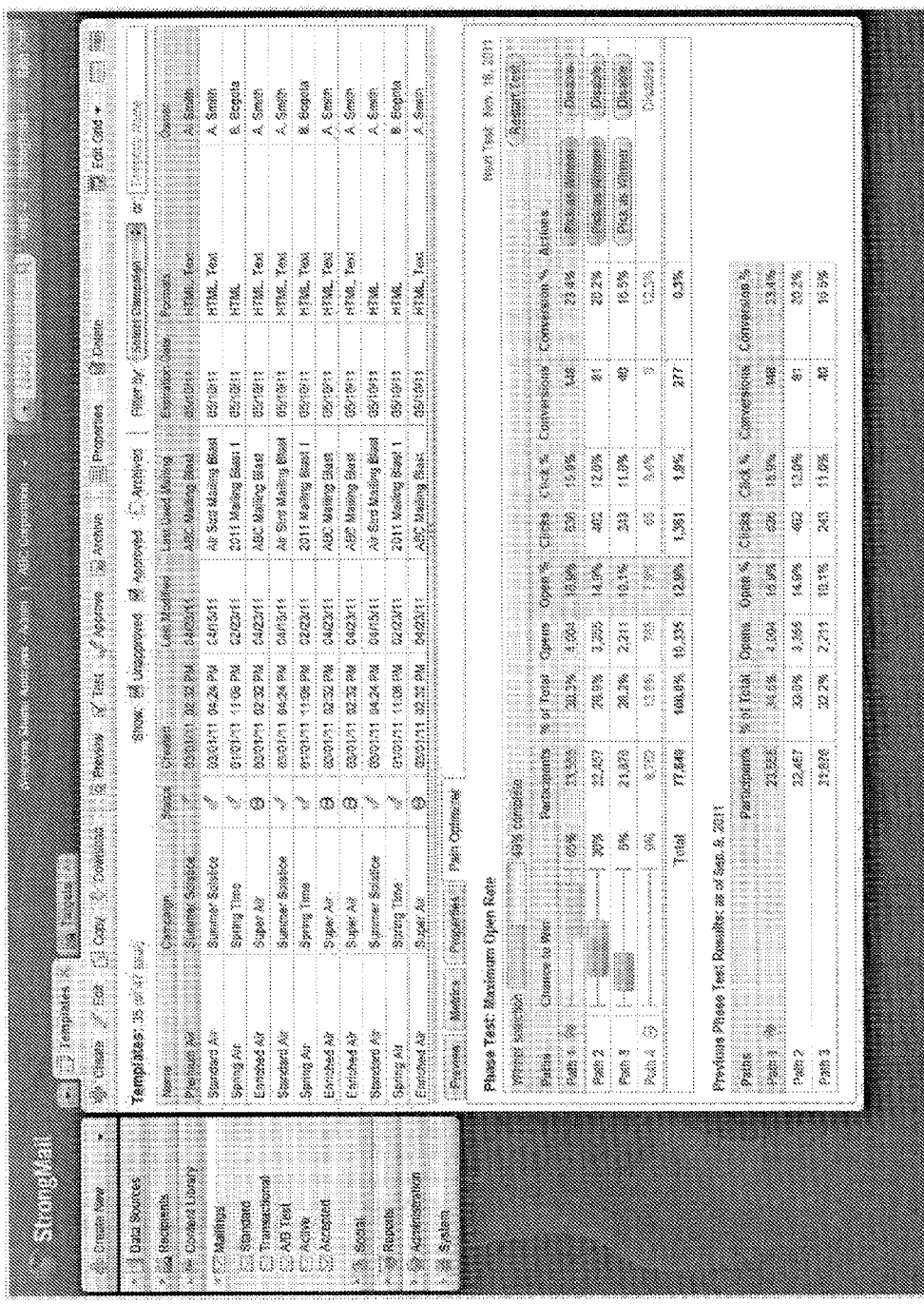
FIG. 8 is a graphical illustration of an interface for managing a plurality of test paths in accordance with some embodiments.

FIG. 8 is a graphical illustration of an interface for managing a plurality of test paths in accordance with some embodiments. In the illustrations, click rate percentages, open rate percentages, and conversion rate percentages are tabulated for a plurality of paths 60.

Figure 9:
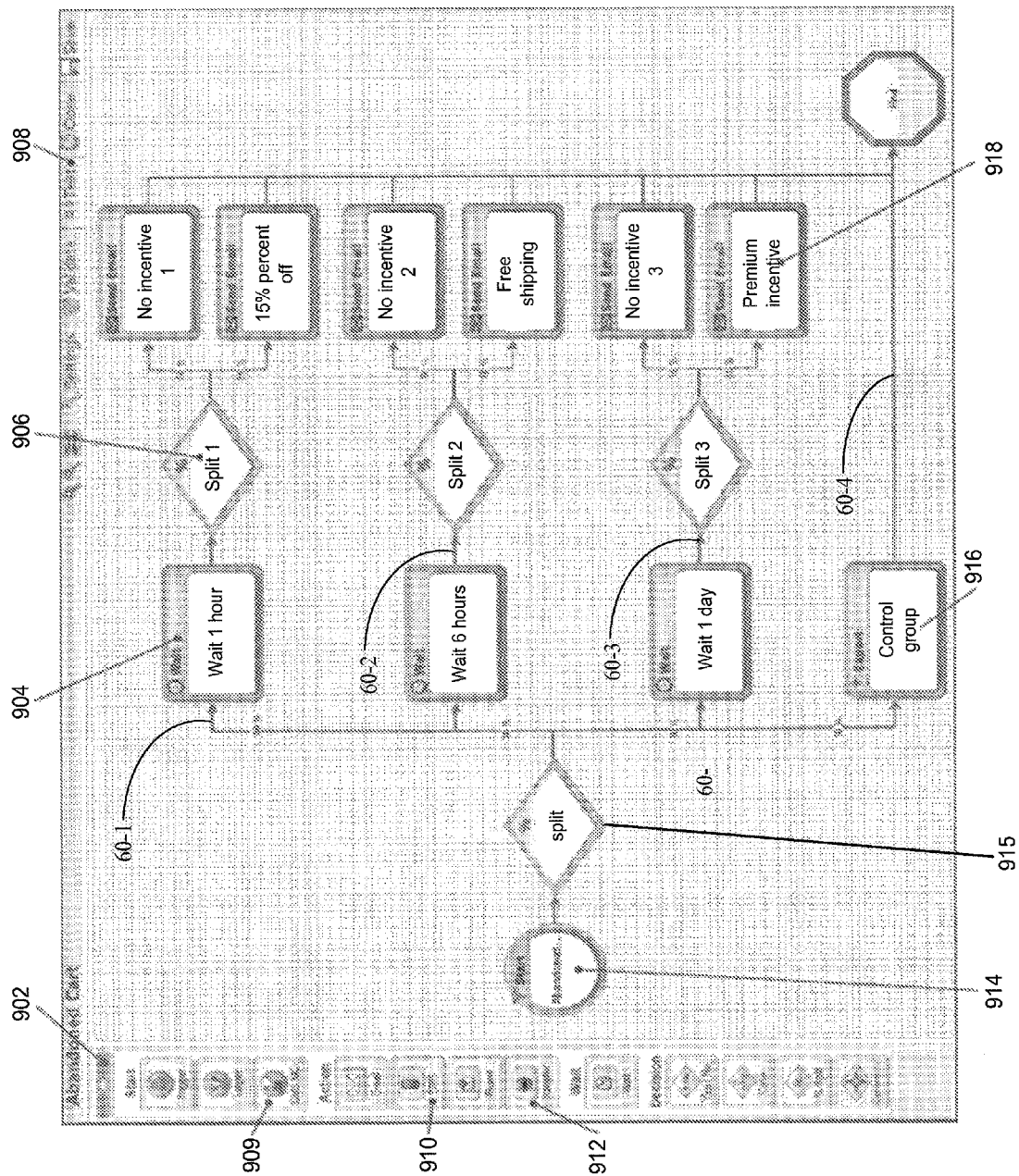
FIG. 9 is a graphical illustration of an exemplary implementation of a path optimizer in a computer based digital message campaign using computer based processing in accordance with some embodiments.

FIG. 9 is a graphical illustration of an exemplary implementation of a path optimizer in a computer based digital message campaign using computer based processing in accordance with some embodiments. In FIG. 9, element 902 indicates how multi-stage paths can be created with drag and drop simplicity from listed action, decisions and other control elements. For instance, element 909 allows for the feature of listening for an SMS message to be dropped into any path whereas element 912 allows for the transfer to another program. Element 914 highlights how initiation of a plurality of paths can be triggered, e.g., via real time integration with external systems. At element 915, data is split among a plurality of paths 60 on a predetermined basis. Element 918 illustrates how multiple offers to increase results can be made. Element 904 illustrates how customized delivery schedule (e.g., wait 1 hour, wait a predetermined period of time) can be imposed in a path in order to optimize impact. Element 906 illustrate how message flow can be controlled via rule or split-based routing. Element 908 illustrates how paths can be proofed by sending test messages for every possible path 60.

REFERENCES CITED

All references cited herein are incorporated herein by reference in their entirety and for all purposes to the same extent as if each individual publication or patent or patent application was specifically and individually indicated to be incorporated by reference in its entirety herein for all purposes.

MODIFICATIONS

The present disclosure can be implemented as a computer program product that comprises a computer program mechanism embedded in a computer readable storage medium. For instance, the computer program product could contain the program modules shown in FIG. 3 or a program that embodies the flowchart illustrated in FIG. 4. These program modules can be stored on a CD-ROM, DVD, magnetic disk storage product, or any other computer readable data or program storage product. The program modules can also be embedded in permanent storage, such as ROM, one or more programmable chip, or one or more application specific integrated circuits (ASICs). Such permanent storage can be localized in a server, 802.11 access point, 802.11 wireless bridge/station, repeater, router, mobile phone, or other electronic devices.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

What is claimed:

1. A method for path optimization for a message campaign, the method being performed by one or more processors, the method comprising:

displaying a graphical user interface representation of the message campaign, wherein the message campaign is electronically connected to one or more sources of destination target information, the one or more sources of destination target information collectively defining a plurality of recipients;

receiving a plurality of sets of input instructions, each respective set of input instructions in the plurality of sets of input instructions corresponding to a path in a plurality of paths in the message campaign, wherein, each path defines non-content characteristics of the message campaign according to which associated messages are sent, including: type, quantity, means for sending, recipient, and at least one of interval, order and frequency;

the plurality of paths in the message campaign including:

a first path specifying that a first subset comprising one or more electronic messages is to be sent following a delay of a first predefined wait period to a first subset of recipients, wherein the first subset of recipients includes two or more recipients; and a second path specifying that a second subset comprising one or more electronic messages is to be sent following a delay of a second predefined wait period, different from the first predefined wait period, to a second subset of recipients, different from the first subset of recipients, wherein the second subset of recipients includes two or more recipients;

for each respective set of input instructions in the plurality of sets of input instructions, sending a respective subset of electronic messages in a first plurality of electronic messages according to a corresponding path in the plurality of paths to a respective subset of recipients in the plurality of recipients, including sending the first subset comprising one or more electronic messages to the first subset of recipients following the delay of the first predefined wait period and sending the second subset of electronic messages to the second subset of recipients following the delay of the second predefined wait period;

monitoring responses to the first subset comprising one or more electronic messages;

determining a winning path from among the plurality of paths based on a path discriminator, the path discriminator using:

i) a correlation of a criterion with a goal for the message campaign for each respective set of input instructions in the plurality of sets of input instructions, and ii) the responses to the first subset comprising one or more electronic messages;

upweighting, responsive to the determining, the winning path from among the plurality of paths; and using the message campaign with the upweighted winning path by causing a second plurality of electronic messages to be sent through the winning path to recipients in the plurality of recipients.

2. The method of claim 1, wherein a respective path in the plurality of paths comprises a plurality of steps and one or more input nodes, wherein an input node in the one or more input nodes corresponds to a step in the plurality of steps.

3. The method of claim 1, wherein determining the winning path is performed without human intervention.

4. The method of claim 1, wherein a respective path in the plurality of paths comprises a subpath branching from a decision block.

5. The method of claim 1, wherein the graphical user interface representation includes a drag and drop capability for receiving a respective set of input instructions in the plurality of sets of input instructions.

6. The method of claim 1, wherein the graphical user interface representation includes a configuration screen.

7. The method of claim 1, further including receiving, via the graphical user interface, an override input that overrides the winning path of the determining step with a manually-selected path in the plurality of paths that is designated by the override input.

8. The method of claim 1, wherein determining the winning path includes comparing a number of user clicks, opens, or conversions uniquely associated with each path in the plurality of paths.

9. The method of claim 1, wherein determining the winning path requires a number of responses that exceeds a predetermined sample size threshold.

10. The method of claim 1, further comprising selecting a new winning path from among the plurality of paths by repeating, at a later time, the sending, monitoring, determining and upweighting steps.

11. The method of claim 1, wherein upweighting the winning path causes a path in the plurality of paths other than the winning path to not be implemented in the message campaign during the using step.

12. The method of claim 1, wherein upweighting the winning path causes the winning path to be used more often in the using step than a path in the plurality of paths that is not the winning path and wherein the path that is not the winning path is used in the using step for a portion of the electronic messages in the second plurality of electronic messages.

13. The method of claim 1, wherein an electronic message in the first plurality of messages is an E-mail message.

14. The method of claim 1, wherein the one or more sources of destination target information comprise a database, a spreadsheet, or a web service feed.

15. A computer system for performing path optimization for a message campaign, the computer system comprising a processor and a memory, the memory comprising instructions executable by the processor for:
   displaying a graphical user interface representation of the message campaign, wherein the message campaign is electronically connected to one or more sources of destination target information, the one or more sources of destination target information collectively defining a plurality recipients;
   receiving a plurality of sets of input instructions, each respective set of input instructions in the plurality of sets of input instructions corresponding to a path in a plurality of paths in the message campaign, wherein, each path defines non-content characteristics of the message campaign according to which associated messages are sent, including: type, quantity, means for sending, recipient, and at least one of interval, order and frequency;
   the plurality of paths in the message campaign including:
      a first path specifying that a first subset comprising one or more electronic messages is to be sent following a delay of a first predefined wait period to a first subset of recipients, wherein the first subset of recipients includes two or more recipients; and
      a second path specifying that a second subset comprising one or more electronic messages is to be sent following a delay of a second predefined wait period, different from the first predefined wait period, to a second subset of recipients, different from the first subset of recipients, wherein the second subset of recipients includes two or more recipients;
   for each respective set of input instructions in the plurality of sets of input instructions, sending a respective subset of electronic messages in a first plurality of electronic messages according to a corresponding path in the plurality of paths to a respective subset of recipients in the plurality of recipients, including sending the first subset comprising one or more electronic messages to the first subset of recipients following the delay of the first predefined wait period and sending the second subset of electronic messages to the second subset of recipients following the delay of the second predefined wait period;
   monitoring responses to the first subset comprising one or more electronic messages; determining a winning path from among the plurality of paths based on a path discriminator, the path discriminator using:
      i) a correlation of a criterion with a goal for the message campaign for each respective set of input instructions in the plurality of sets of input instructions, and
      ii) the responses to the first subset comprising one or more electronic messages;
   upweighting, responsive to the determining, the winning path from among the plurality of paths; and
   using the message campaign with the upweighted winning path by causing a second plurality of electronic messages to be sent through the winning path to recipients in the plurality of recipients.

16. The computer system of claim 15, wherein a respective path in the plurality of paths comprises a plurality of steps and one or more input nodes, wherein an input node in the one or more input nodes corresponds to a step in the plurality of steps.

17. The computer system of claim 15, wherein determining the winning path is performed without human intervention.

18. The computer system of claim 15, wherein a respective path in the plurality of paths comprises a subpath branching from a decision block.

19. The computer system of claim 15, wherein the graphical user interface representation includes a drag and drop capability for receiving a respective set of input instructions in the plurality of sets of input instructions.

20. The computer system of claim 15, wherein the graphical user interface representation includes a configuration screen.

* * * * *